(12) United States Patent
Malik et al.

(10) Patent No.: US 7,773,577 B2
(45) Date of Patent: Aug. 10, 2010

(54) METHOD FOR REDUCING MEDIUM ACCESS OVERHEAD IN A WIRELESS NETWORK

(75) Inventors: Rahul Malik, Singapore (SG); Pek Yew Tan, Singapore (SG); Daichi Imamura, Kanagawa (JP); Junya Yamazaki, Kanagawa (JP); Katsuyoshi Naka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 307 days.

(21) Appl. No.: 10/591,600

(22) PCT Filed: Mar. 8, 2005

(86) PCT No.: PCT/JP2005/004401

§ 371 (c)(1),
(2), (4) Date: Sep. 5, 2006

(87) PCT Pub. No.: WO2005/086426

PCT Pub. Date: Sep. 15, 2005

(65) Prior Publication Data

US 2007/0171876 A1    Jul. 26, 2007

(30) Foreign Application Priority Data

Mar. 8, 2004  (JP)  .............................. 2004-064457
Oct. 18, 2004  (JP)  .............................. 2004-303253

(51) Int. Cl.
*H04W 72/08* (2009.01)
*H04W 72/02* (2009.01)
*H04W 72/04* (2009.01)

(52) U.S. Cl. ...................... 370/348; 370/345; 370/347

(58) Field of Classification Search ................ 370/349, 370/345, 336, 470, 510, 512
See application file for complete search history.

(56) References Cited

U.S. PATENT DOCUMENTS

| 5,642,360 | A  | * | 6/1997  | Trainin           | 370/230 |
| 6,577,630 | B1 | * | 6/2003  | Markwalter et al. | 370/392 |
| 7,095,754 | B2 | * | 8/2006  | Benveniste        | 370/465 |
| 7,305,004 | B2 | * | 12/2007 | Sherman           | 370/462 |

(Continued)

FOREIGN PATENT DOCUMENTS

CN    1420639    5/2003

(Continued)

OTHER PUBLICATIONS

Chinese Office Action dated Mar. 28, 2008 with English Translation.

(Continued)

*Primary Examiner*—Rafael Pérez-Gutiérrez
*Assistant Examiner*—Frank Donado
(74) *Attorney, Agent, or Firm*—Dickinson Wright PLLC (57) ABSTRACT

The invention includes methods for achieving efficient channel access in a wireless communications system. The invention is embodied in a wireless network adapter that is present in all stations belonging to the network. The invention describes methods by which access overheads may be reduced by introducing the concept of context sensitive frame timing—using which stations redefine and interpret frame timing depending on context and signaling. The result of realizing the invention is an improvement in medium utilization efficiency and consequently, an overall improvement in network throughput.

8 Claims, 8 Drawing Sheets

U.S. PATENT DOCUMENTS

| | | | |
|---|---|---|---|
| 2002/0184389 A1* | 12/2002 | Sherman | 709/245 |
| 2003/0091066 A1* | 5/2003 | Choi et al. | 370/468 |
| 2003/0169769 A1 | 9/2003 | Ho et al. | |
| 2004/0071154 A1* | 4/2004 | Wentink | 370/448 |
| 2005/0025131 A1* | 2/2005 | Ko et al. | 370/352 |
| 2005/0063405 A1* | 3/2005 | Borsum et al. | 370/419 |
| 2005/0063408 A1* | 3/2005 | Famolari | 370/431 |
| 2005/0147115 A1* | 7/2005 | Li et al. | 370/449 |
| 2005/0157747 A1* | 7/2005 | Yang et al. | 370/465 |
| 2005/0163150 A1* | 7/2005 | Yang et al. | 370/445 |
| 2007/0058665 A1* | 3/2007 | Ho et al. | 370/447 |

FOREIGN PATENT DOCUMENTS

| | | |
|---|---|---|
| WO | 0241590 | 5/2002 |

OTHER PUBLICATIONS

PCT International Search Report dated Jun. 17, 2005.
IEEE: "Wireless MAC and PHY Specifications, 802.11, pp. 71-99, 1997," IEEE, USA, XP002330643, paragraph '9.2.3!.
ETSI TS 101 761-1 v1.1.1 (Apr. 2000), Broadband Radio Access Networks (BRAN); HIPERLAN Type 2; Data Link Control (DCL) Layer Part 1: Basic Data Transport Functions, pp. 1-87.

\* cited by examiner

METHOD FOR REDUCING MEDIUM ACCESS OVERHEAD IN A WIRELESS NETWORK

TECHNICAL FIELD

The present invention relates to a wireless communication method and, more particularly, to a method for reducing medium access overhead in a wireless network.

BACKGROUND ART

Figure 1:
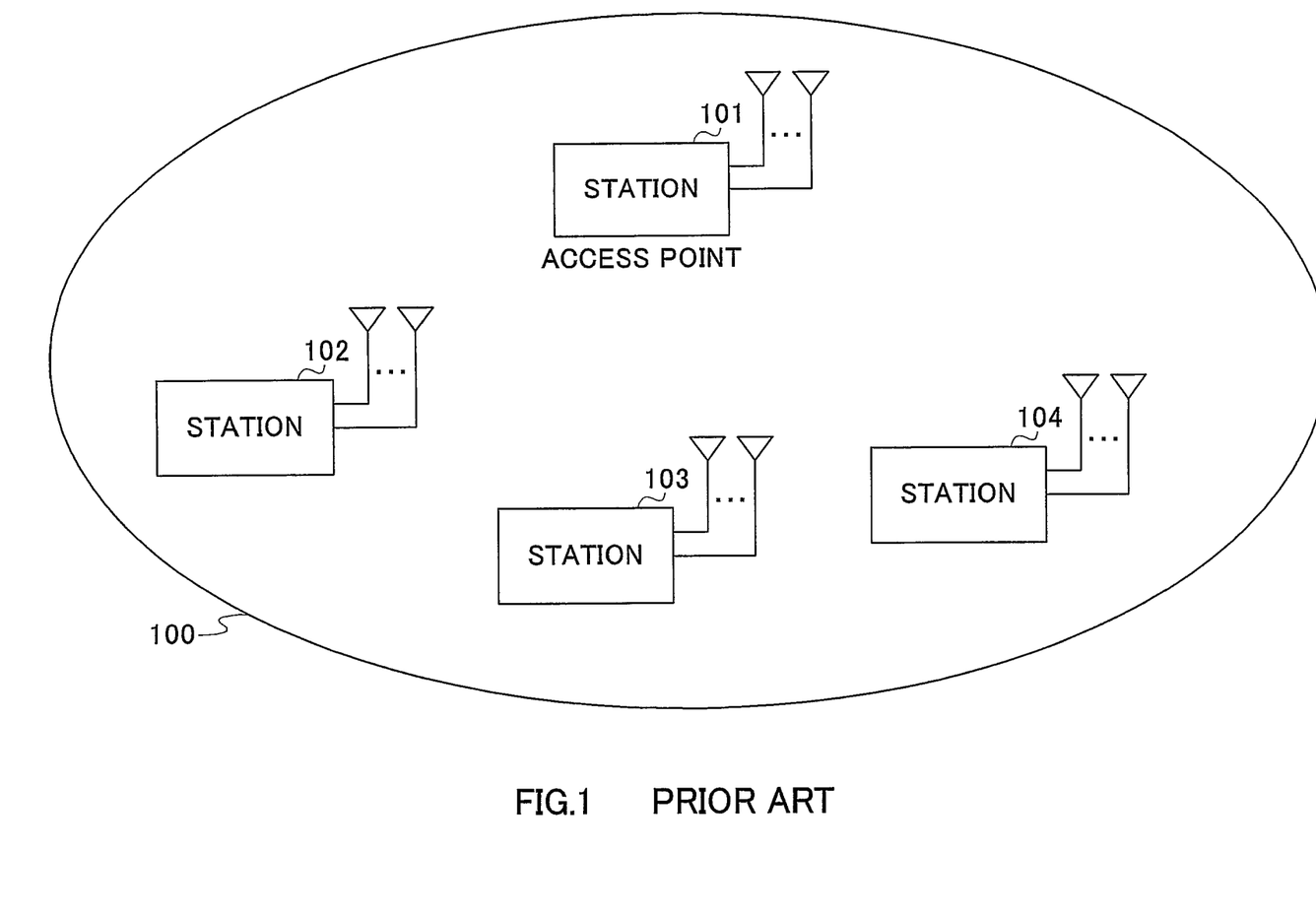
FIG. 1 shows a wireless network that consists of several stations each with a singularity or plurality of transmission chains. One of the stations is designated the access point and may serve the functionality of a network coordinator and gateway to external networks.

FIG. 1 depicts a wireless network 100 consisting of several stations 101, 102, 103 and 104. Depending on the kind of network i.e. infrastructure or adhoc, the wireless network may provide its stations with connectivity to other networks, wireless or otherwise. In an infrastructure network, this connectivity is typically achieved by an Access Point (AP). In the example of FIG. 1, station 101 is arbitrarily designated as the AP. Adhoc networks typically exist for the local transfer of data between a plurality of co-located devices. As such, typically adhoc networks do not have a link to external networks.

Medium Access Control

Medium Access Control (MAC) architectures are fundamentally of two different types—centralized control and distributed control. In centrally controlled systems, one of the stations in the network is responsible for allocating channel capacity to individual stations and coordinating access to the channel. In infrastructure networks, the AP 101 typically handles this network coordination functionality. In adhoc networks, one of the stations or nodes typically assumes the role of network coordinator and performs this function.

In centrally controlled networks, the network coordinator typically schedules the use of the available channel resources depending on the requirements of different stations. Stations then confirm to this schedule, which is either announced by polling as per the Point Coordination Function (PCF) mechanism specified in IEEE 802.11 standard ("Local and Metropolitan Area Networks—Specific Requirements—Part 11: Wireless LAN Medium Access Control (MAC) and Physical Layer (PHY) specifications", IEEE Std802.11-1999, IEEE, August 1999: hereinafter referred to as Non-Patent Document 1) or by a-priori schedule announcement and timing synchronization as in the HIPERLAN/2standard ("Broadband Radio Access Networks (BRAN) HIPERLAN Type 2 Data Link Control (DLC) Layer", ETSI TS 101 761-1 v1.1.1, April 2000: hereinafter referred to as Non-Patent Document 2).

Stations effecting communication using distributed channel access mechanisms typically operate as peers whereby each station contending to transmit data on the medium performs a random backoff in order to reduce the probability of collision with other stations, and thereby increase the effective throughput of the network. The Distributed Coordination Function (DCF) specified in the IEEE 802.11 standard (Non-Patent Document 1) is an example of such a system. Enhancements to the basic DCF access mechanism include prioritized access for certain traffic classes which are realized by means of differentiated medium access delays. An example of this is embodied as the Hybrid Coordination Function Contention Based Channel Access (HCCA) in the draft IEEE 802.11e specification ("Draft Supplement to LAN/MAN Specific Requirements—Part 11: Wireless Medium Access Control (MAC) and Physical Layer (PHY) specifications: MAC Enhancements for Quality of Service (QoS)", IEEE Std 802.11e/D7.0 January 2004: hereinafter referred to as Non-Patent Document 3).

While centralized channel access has been shown to be beneficial in delivering data that is of a recurring/periodic nature and requires a certain level of Quality of Service (QoS), examples being audio-visual (AV) and voice streams, distributed channel access mechanisms are found to be more efficient for non-recurring data such as http and ftp traffic, which are of a more bursty nature. As such, standards such as the IEEE 802.11 (Non-Patent Document 1) and the ongoing 802.11e draft (Non-Patent Document 3) cater to both kinds of traffic by specifying channel access mechanisms that cater to both stream-like and bursty traffic.

Carrier Sense Multiple Access

Conventional contention based channel access utilizes the well-studied Carrier Sense Multiple Access (CSMA) protocol. According to the CSMA protocol, a station wishing to transmit data senses the medium using a Clear Channel Assessment (CCA) algorithm as is specified in Non-Patent Document 1. Upon detecting the medium to be idle, the station waits for a minimum mandatory amount of time during which the medium must remain idle, prior to choosing a random backoff. The random backoff is decremented at fixed slot intervals while observing the medium to be idle.

As stated previously, stations are required to wait for a constant duration of time before choosing a random backoff. This duration accounts for certain physical layer processing overheads such as CCA and processing delays. At the MAC level, variations in this constant duration are intended to provide prioritized access to a response frame, or to stations with higher priority such as the access-point (which generally have the ability to preempt other stations in attempting to access the medium), or to stations with traffic of a higher priority.

Upon decrementing the random backoff to zero, the station initiates its transmission. As in a distributed environment, several stations simultaneously contend to transmit on the medium, there exists a finite probability that two stations may attempt to simultaneously transmit, resulting in a collision and a net reduction in the network throughput.

Figure 2:
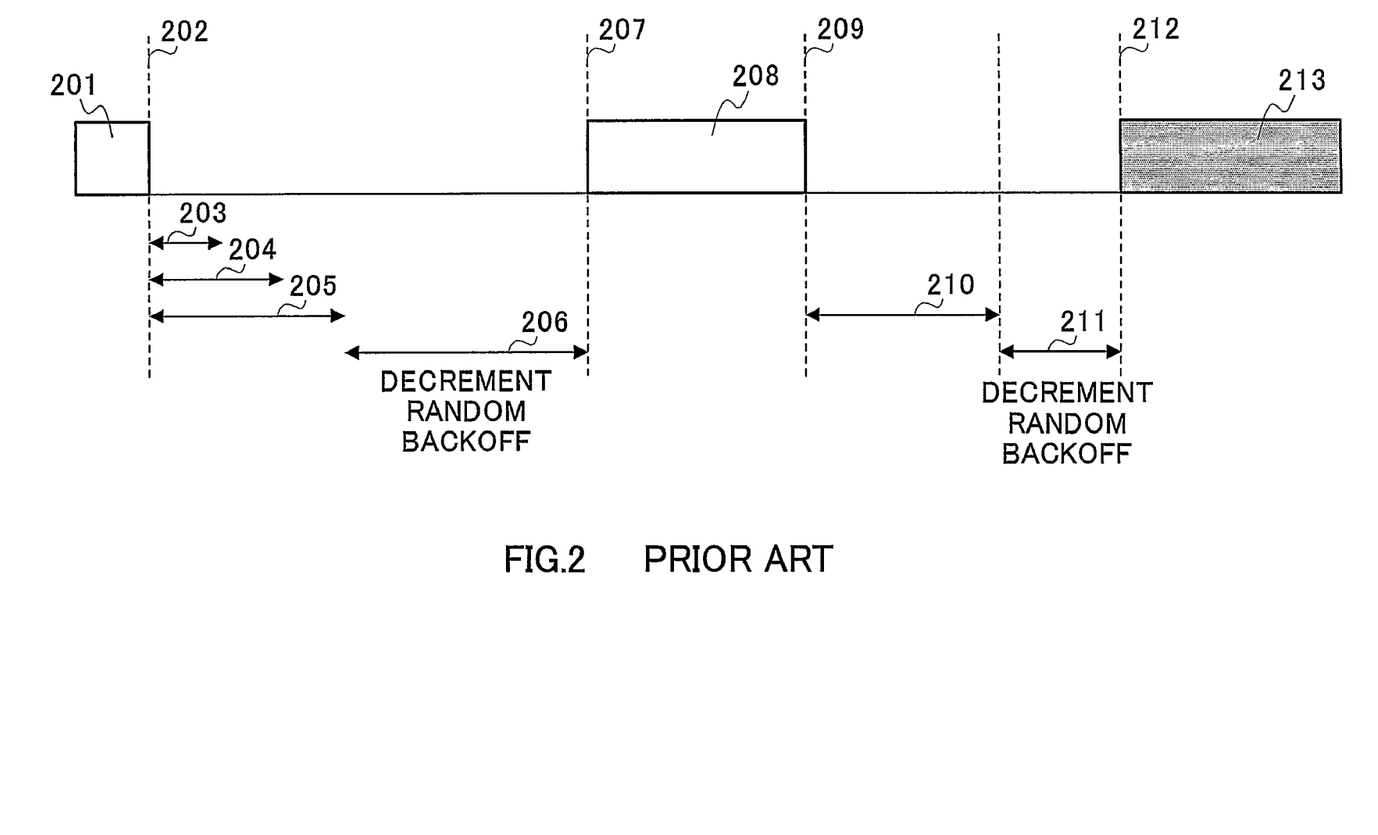
FIG. 2 shows an example of medium access using the DCF protocol specified in Non-Patent Document 1.

FIG. 2 uses the 802.11 standard (Non-Patent Document 1) as an example to illustrate a scenario in which a station attempts access on the medium using the contention based DCF access mechanism. Upon detecting the medium to be idle and with data to transmit at time instant 202, the station starts waiting for a constant duration of idle time, referred to as the DCF Inter-Frame Space (DIFS) 205. The Figure also marks out the Short Inter-Frame Space (SIFS) 203 that is used for response or continuation frames, and the PCF Inter-Frame Space (PIFS) 204 that is used by the AP to preempt medium access. As explained previously, the SIFS and PIFS are used to provide higher priority to response frames and the access point respectively. In addition to the SIFS and PIFS, the 802.11e draft specification (Non-Patent Document 3) specifies differentiated levels of DIFS in the form of Access Category Inter-Frame Spaces (AIFS). These are primarily targeted at providing differentiated service to different traffic categories.

Upon completion of the DIFS interval, the station chooses a random backoff value, and begins to decrement it every slot time, while the medium is idle 206. At time instant 207 another station transmits 208 on the medium, resulting in the CCA indicating to the station that the channel is busy and resulting in deferral of the backoff decrement procedure. Once the other station has completed its transmission at time instant 209, the original station detects the medium to be idle, waits for DIFS duration 210 and decrements the remainder of its backoff counter 211 to zero, initiating its transmission 213 at time instant 212.

Virtual Carrier Sensing

As wireless devices are unbounded and tether-less, wireless networks often encounter the problem of hidden-nodes—i.e. a device that is within radio-range of the recipient station may not be within the radio-range of the transmitting station. An example of this is a scenario that results in a node "hidden" from the transmitter not being able to receive the transmitted frame. As a result of this, the "hidden station" may initiate a transmission of its own, resulting in a collision at the receiver.

To counter the problem of hidden nodes the IEEE 802.11 standard (Non-Patent Document 1) specifies a virtual carrier sensing mechanism. In addition to the CSMA/CA technique, stations maintain a Network Allocation Vector (NAV), which is an indicator of periods of expected activity on the medium. A station with its NAV set will not initiate a transmission, irrespective of the medium state, as determined by its carrier sensing mechanism.

Stations receiving a transmission use information contained in the duration field of the frame to set their NAVs. The duration field of a frame typically includes the duration required to complete any expected response frame.

Figure 3:
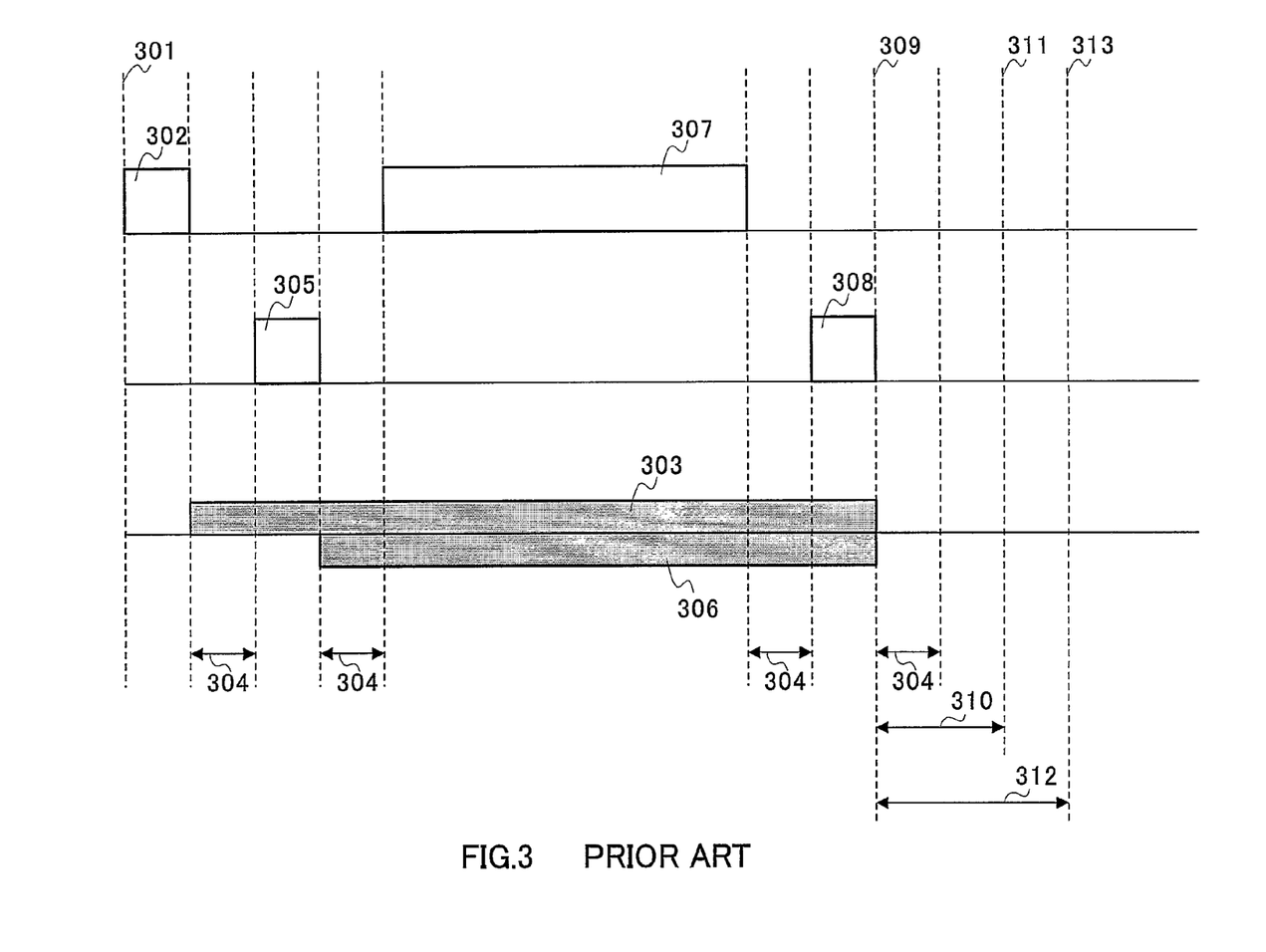
FIG. 3 shows an example of virtual carrier sensing that is specified in Non-Patent Document 1.

Another mechanism designed to facilitate the virtual carrier sensing mechanism is the Request-To-Send/Clear-To-Send (RTS/CTS) frame exchange sequence specified in Non-Patent Document 3. FIG. 3 depicts an example in which a transmitter, having gained access to the medium at time instant 301, precedes its transmission with an RTS frame 302. The duration value specified in the RTS frame "protects" the intended transmission and its acknowledgement by setting the NAV 303 of all recipient stations up to the instant of time 309. The recipient of the RTS responds one SIFS 304 later, with a CTS frame 305, which sets the NAV 306 of receiving stations up to the instant of time 309. As a result of successful transmission of the RTS and CTS frames all stations within range of both the transmitter and receiver will not initiate transmission up till the time-instant 309 there by allowing the data 307 and acknowledgement 308 transmissions to proceed with a reduced probability of error due to collisions. Upon completion of the frame exchange sequence, stations need to wait for a DIFS 312 duration of medium inactivity before attempting access to the medium at time instant 313. The access point, having a higher priority, may access the medium after a PIFS duration 310 at time instant 311.

The NAV procedure described above proves expensive in terms of bandwidth on the medium in scenarios where for some reason a station that initiated the RTS-frame, fails to transmit after the CTS is received. Such a scenario would result in the duration of time protected by the NAV in going unutilized. To counter scenarios where the medium would be otherwise unutilized Non-Patent Document 1 provides for NAV reset procedures.

In the scenario described above, stations that used the RTS-frame to set their NAV may reset their NAV i.e. initiate access to the medium if their PHY layer modems do not indicate medium activity at the point where the originator of the RTS is expected to access the channel. After the timeout interval, stations undergo a NAV-reset and wait for a DIFS duration followed by a random backoff before transmitting. Likewise, the station initiating the RTS may access the medium by performing a backoff procedure if after a CTS time-out the CTS is not received. Similar NAV reset procedures are defined for stations that set their NAV based on duration values indicated in a fragment of a frame exchange sequence.

In prior art such as described in Non-Patent Document 1, at least three independent inter-frame timings, namely—SIFS, PIFS and DIFS are required in order to facilitate differentiation between response/continuation frames, pre-emption by the access point and conventional channel access by stations. In Non-Patent Document 3 further differentiation is provided for traffic of stations performing conventional channel access by replacing the DIFS with four different AIFS inter-frame spaces.

In a moderately loaded medium it is quite conceivable that a station would need to backoff several times (due to transmission pre-emption by other stations) before it succeeds in making a transmission. Under the DCF protocol, each successive backoff involves waiting for a DIFS duration before re-initiating the decrement process of the backoff counter.

In one of its embodiments the current invention describes a method to reduce the inter-frame space by facilitating a means to dynamically alter the interpretation of the inter-frame space by means of the methods laid out in this text.

DISCLOSURE OF INVENTION

It is an object of the invention to provide a method for reducing medium access overhead in a wireless network.

According to an aspect of the invention, a wireless communication method comprises the steps of obtaining a signal indicating no expected response or intent to continue and redefining frame timing based on the obtained signal in order to reduce the inter-frame space.

According to another aspect of the invention, a method for reducing medium access overhead in a wireless network consisting of a plurality of stations, wherein the station dynamically reduces the value of the inter-frame space by redefining its interpretation, the method comprising the steps of detecting a signal indicating no expected response or intent to continue in a received signal, and redefining the interpretation of the inter-frame space to be smaller when the signal is detected, and wherein the value of the inter-frame space may depend on the capabilities of the physical layer.

According to a further aspect of the invention, a method for reducing medium access overhead in a wireless network consisting of a plurality of stations, wherein the station dynamically reduces the inter-frame space by redefining interpretation of the inter-frame space, the method comprising the steps of checking a medium activity indicator determining the end of activity on the medium, and redefining the interpretation of the inter-frame space to be smaller when the medium activity indicator is checked.

According to a still further aspect of the invention, a method for reducing medium access overhead in a wireless network consisting of a plurality of stations, wherein the station dynamically reduces the value of the inter-frame space by redefining the interpretation of the inter-frame space, the method comprising the steps of resetting a medium activity indicator when no medium activity is indicated at the instant of time that activity is expected as indicated by the medium activity indicator, and redefining the interpretation of the subsequent inter-frame space to be smaller when the medium activity indicator is reset, and wherein the value of the inter-frame space may depend on the capabilities of the physical layer.

Discrete representation of inter-frame spaces may be possible as follows.

According to a yet further aspect of the invention, a wireless communication method comprises the steps of obtaining a signal indicating no expected response or intent to continue and redefining frame timing based on the obtained signal in order to reduce the minimum number of mandatory inter-frame spaces.

According to a yet further aspect of the invention, a method for reducing medium access overhead in a wireless network consisting of a plurality of stations, wherein the station dynamically alters the minimum number of mandatory inter-frame spaces from M to N (both integers; M is larger than N) by redefining interpretation of the inter-frame spaces, the method comprising the steps of detecting a signal indicating no expected response or intent to continue in a received signal, and redefining the interpretation of the inter-frame spaces to contain fewer time slots when the signal is detected.

According to a yet further aspect of the invention, a method for reducing medium access overhead in a wireless network consisting of a plurality of stations, wherein the station dynamically alters the minimum number of mandatory inter-frame spaces from three to two by redefining interpretation of the inter-frame spaces, the method comprising the steps of detecting a signal indicating no expected response or intent to continue in a received signal, and redefining the interpretation of the inter-frame spaces to result in two time slots when the signal is detected.

According to a yet further aspect of the invention, a method for reducing medium access overhead in a wireless network consisting of a plurality of stations, wherein the station dynamically alters the minimum number of mandatory inter-frame spaces from M to N (both integers; M is larger than N) by redefining interpretation of the inter-frame spaces, the method comprising the steps of checking a medium activity indicator determining the end of activity on the medium, and redefining the interpretation of the inter-frame spaces to contain fewer time-slots when the medium activity indicator is checked.

According to a yet further aspect of the invention, a method for reducing medium access overhead in a wireless network consisting of a plurality of stations, wherein the station dynamically alters the minimum number of mandatory inter-frame spaces from M to N (both integers; M is larger than N) by redefining the interpretation of the inter-frame spaces, the method comprising the steps of resetting a medium activity indicator when no medium activity is indicated at the instant of time that activity is expected as indicated by the medium activity indicator, and redefining the interpretation of the inter-frame spaces to contain fewer time-slots when the medium activity indicator is reset.

More particularly, the invention includes method and system for achieving efficient channel access in a wireless communications system. The invention is embodied in a wireless network adapter 400 that facilitates communication for a network node. Wireless networking standards, such as IEEE 802.11 for example, specify the operation of the layers 1 and 2 of the OSI architectural model. These relate to the physical layer modem 402 and the media access controller 401 in FIG. 4. The invention is specifically embodied in the "IFS-reduction module" 404. The wireless network adapter additionally comprises an interface to upper-layers 405 by which applications send data and control information to the device, and a singularity or plurality of antennas 406 to support the air-interface.

A first embodiment of the invention provides for a means of dynamically altering the interpretation of the inter-frame spaces by means of appropriate signaling between stations thereby achieving the effect of a reduction in medium access delay.

A second embodiment of the invention provides for a method of reducing medium access overheads in accordance with the first embodiment, by providing a mechanism to signal the interpretation of the inter-frame spacing by means of a field in the MAC header of the transmitted frame.

A third embodiment bears similarity in purpose to the second embodiment, the method of signaling the interpretation of the inter-frame spacing now being implemented at the MAC/PHY boundary sublayer by a field in the preamble of the transmitted frame.

A fourth embodiment bears similarity in purpose to the second embodiment, the method of signaling the interpretation of the inter-frame spacing now being implemented at the PHY layer by the transmission on an additional subcarrier during the frame transmission.

A fifth embodiment of the invention provides for a means of dynamically altering the interpretation of inter-frame spaces, by interpreting the information contained in the medium activity indicator—a virtual carrier sensing mechanism, with an intent similar in purpose to the first embodiment.

A sixth embodiment specifies a means of dynamically altering the interpretation of inter-frame spaces, at the instant of a reset in the virtual carrier sensing mechanism, with an intent similar in purpose to the first embodiment.

According to the present invention, it is possible to reduce medium access overhead in a wireless network, thus realizing the improvement in medium utilization efficiency and consequently the overall improvement in network throughput.

BEST MODE FOR CARRYING OUT THE INVENTION

Figure 4:
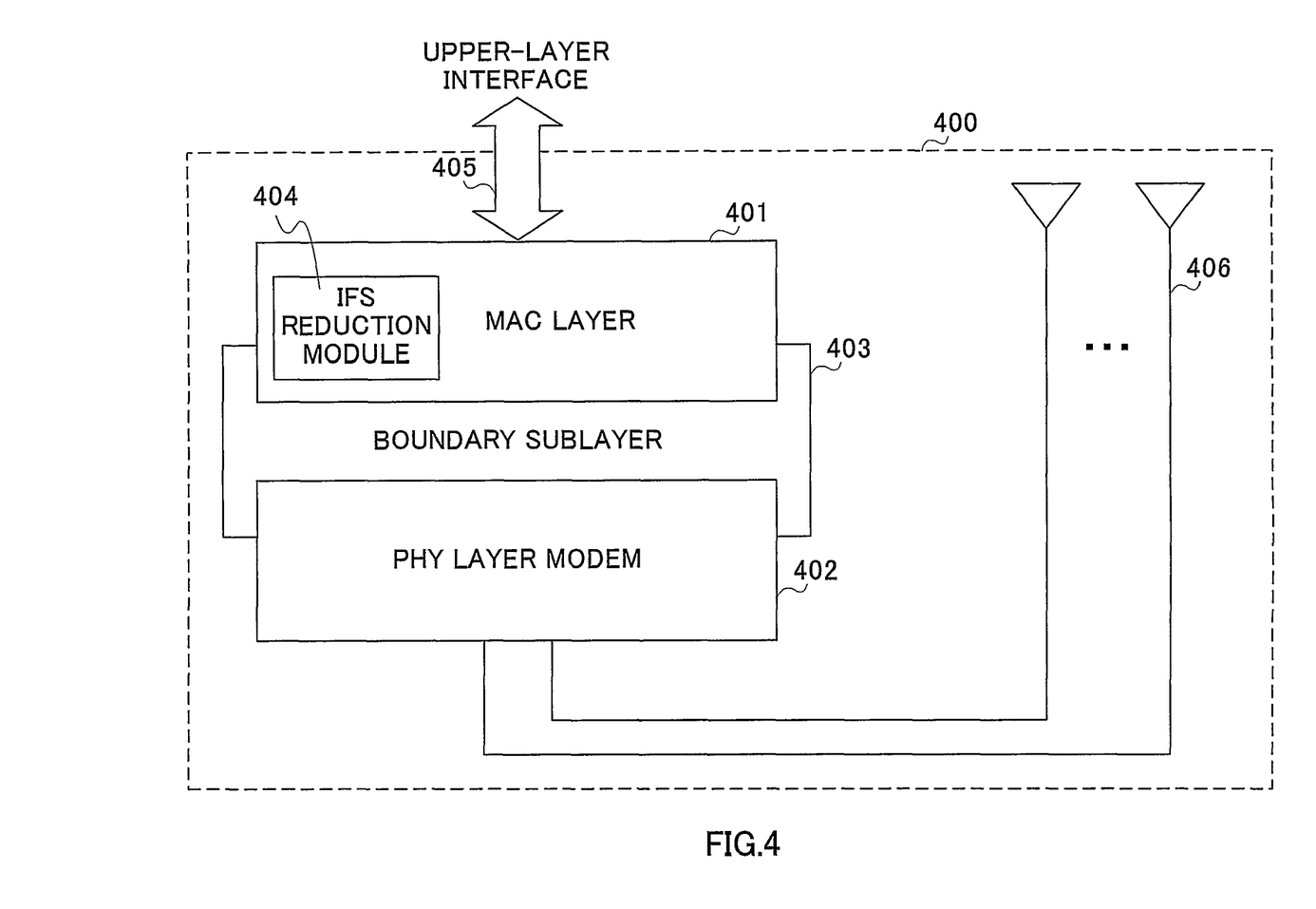
FIG. 4 shows an embodiment of the invention.

As shown in the drawings and for the purposes of illustration, the invention is embodied in an apparatus and a method for wireless network access, typically called a wireless network adapter 400 that is embedded in every station of the wireless network. More specifically, the invention is embodied in the IFS reduction module 404 that is physically realized in the medium access controller 401. However, depending on specific implementation, as will be evident from the subsequent description, the IFS-reduction module 404 may require certain information exchange with the PHY layer modem 402 and the boundary sublayer 403.

Figure 5:
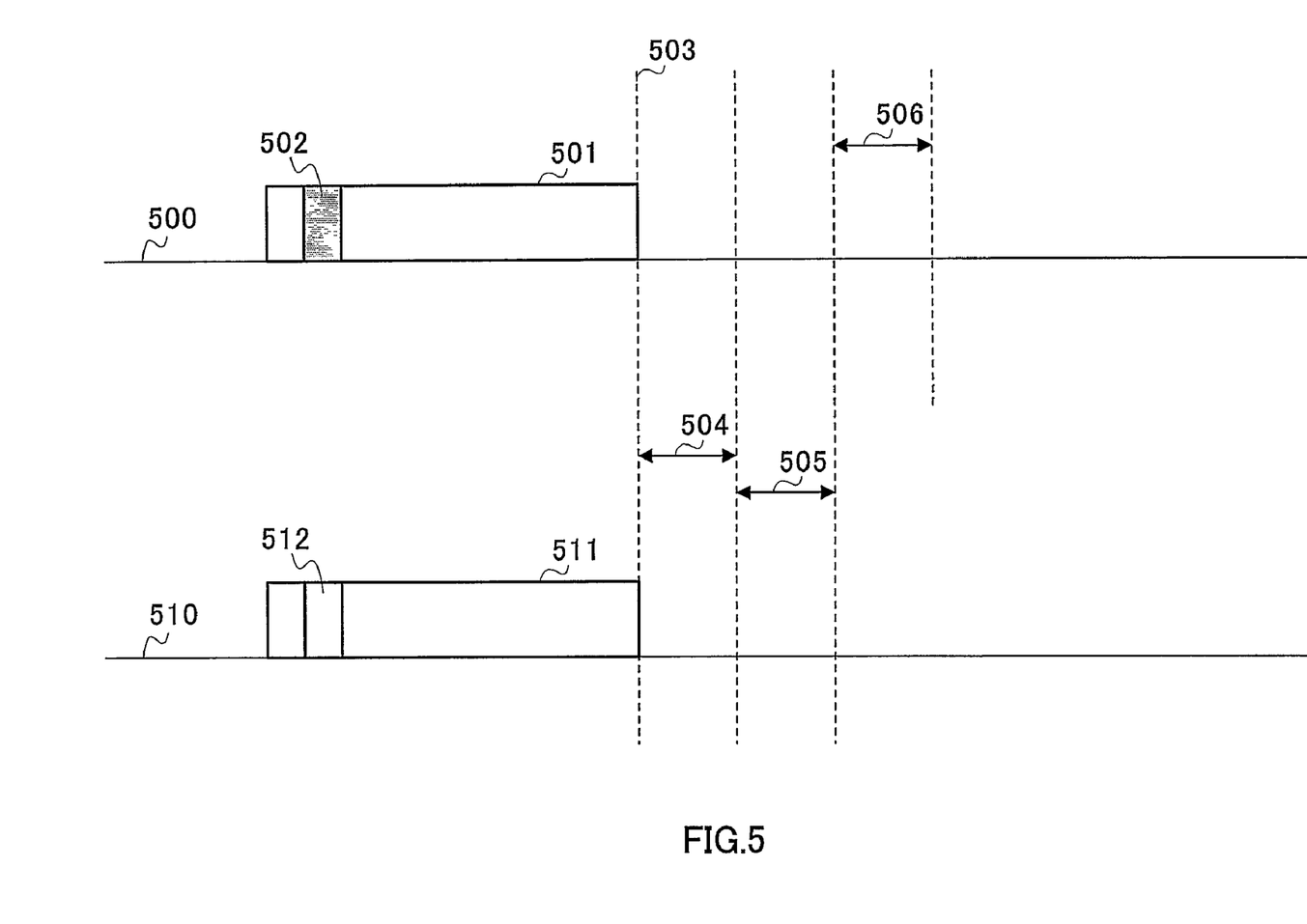
FIG. 5 shows how medium access time may be reduced in accordance with one of the embodiments of the invention.

The initiator of a frame transmission is aware of whether or not a response is expected from the recipient or whether or not it intends to send a continuation frame. As all active stations are required to process at minimum, the header of all frames in order to determine whether or not they are the intended recipients of the frame a station may embed a "response-solicited/continuation" signal 502 in its transmission 501.

Stations receiving a frame with the "response-solicited" field set would interpret the first slot of time 504 after the end of transmission 503 to be used for a response-frame. The second slot 505 would be interpreted as reserved for the access point to pre-empt access to the medium, while the third slot 506 would mark the "minimum medium-idle" time that a station should observe before commencing its own transmission. The sets of timing marked by 504, (504+505) and (504+505+506) are equivalent to the SIFS, PIFS and DIFS timings, respectively, set out in Non-Patent Document 1. Using the methods of the present invention, the sets of timing marked by 504 and (504+505) may be interpreted as a short PIFS (sPIFS) and a short DIFS (sDIFS), respectively. These differing time slots provide differentiated medium access as is required by the MAC protocol. Note that in this embodiment, the word "slot" is used in its generic sense and is different from the definition in Non-Patent Document 1. The absolute duration of the time slots 504, 505 and 506, however, would depend on the implementation of the physical layer modem 402 of the device.

In a frame transmission to which a response is not solicited and to which there would be no continued data transmission by the frame initiator, the "response-solicited/continuation" signal 512 is cleared in the transmission 511. In such a scenario 510, a minimum of two slots is required to facilitate medium access control. The first slot after transmission 504 is reserved for the access-point to pre-empt medium access, while the second slot 505 can be used as the "minimum medium-idle" time that a station should observe before commencing its own transmission. Thus in the scenario 510, we can see how access overhead for certain frame types can be reduced compared with the legacy scenario 500 by suitably interpreting a "response-solicited/continuation" signal.

Note that the new PIFS, that is, the short PIFS (sPIFS), and the new DIFS, that is, the short DIFS (sDIFS), for the scenario 510 have only to be set shorter than the slot length of the PIFS and DIFS for the scenario 500 and are by no means limited such that sPIFS=PIFS and sDIFS=DIFS.

Note that the "response-solicited/continuation" signal that is embodied in the description above may be implemented implicitly, where an existing component of the MAC frame is used to determine whether or not a response/continuation is expected. On the other hand, there are several methods for implementing the "response-solicited/continuation" signal explicitly.

Figure 6:
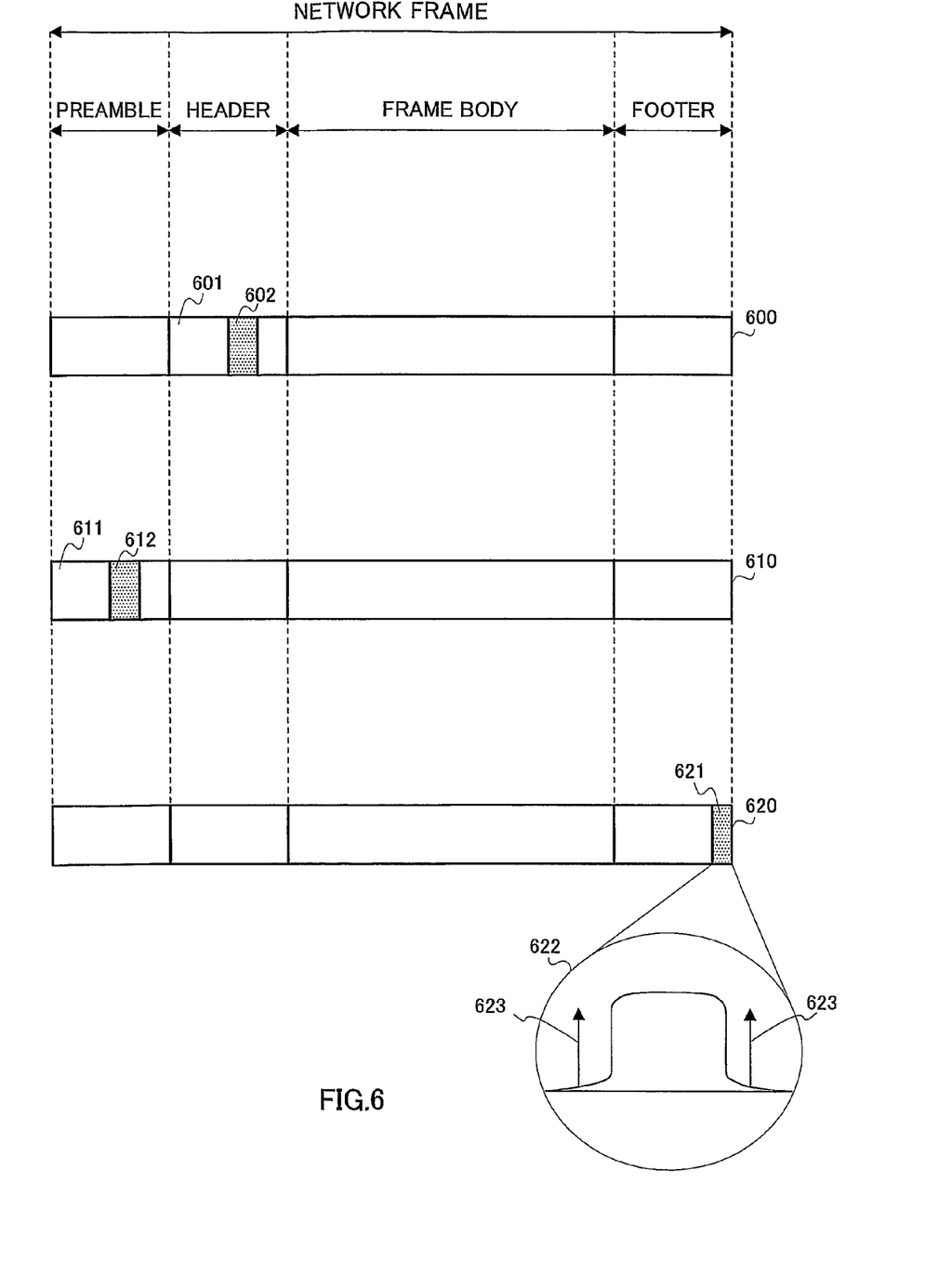
FIG. 6 shows how the method set out in FIG. 5 can be achieved using three distinct embodiments of the invention.

As was stated previously, one method is to embed the information in the header of the frame as a field that is interpreted by the MAC controllers of all active stations receiving the frame. This is depicted in the frame 600 in which the "response-solicited/continuation" is called out as 602 in the frame's MAC header 601.

An alternate embodiment of the "response-solicited/continuation" signal is depicted in the frame 610 where the signal is incorporated as a bit or a combination of bits 612 in the preamble of the transmission 611.

In Japanese Patent Application No. 2003-324793, we described a method for signaling the usage of a particular spatial beam in wireless network using space division multiple access for serving multiple users simultaneously. This is achieved by the method of signature signals, an embodiment of which is transmission on unused subcarriers(s) in the OFDM spectrum. In an alternate embodiment of the current invention, the "response-solicited/continuation" signal may be in the form of transmission on an additional subcarrier or combination of subcarriers. This is depicted as 620 where an OFDM symbol 621 is "signed/colored" by activating an additional pair of subcarriers 623 as called out in the frequency domain representation of the symbol 622.

The frames 600, 610 and 620 provide for different types of implementation of the "response-solicited/continuation" signal. While 600 provides for a realization that may be interpreted and implemented in a device such as a MAC controller 401, the method of 620 provides for a PHY layer realization that may be interpreted and implemented at the PHY layer modem 402. Alternately, 610 depicts an implementation of the "response-solicited/continuation" signal at the MAC/PHY boundary sublayer 403. As is evident from the different types of signaling methods described, there may be several variants to the same end. It is to be understood that the invention is not to be limited by the specific forms or variations of the described methods.

Figure 7:
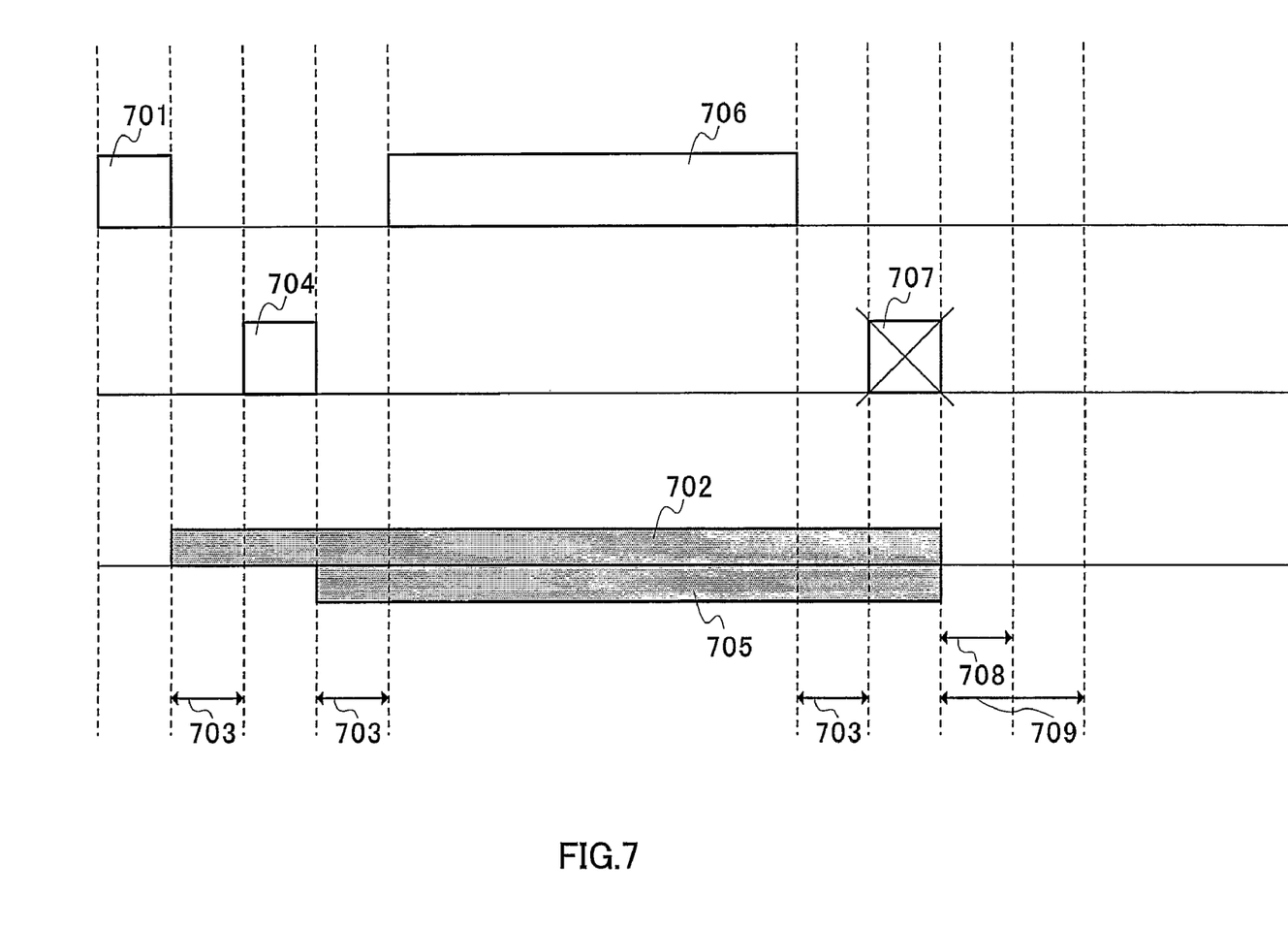
FIG. 7 shows how medium access time may be reduced employing the use of virtual carrier sensing, in accordance with one of the embodiments of the invention.

As described in Non-Patent Document 1, stations implementing CSMA/CA make use of both physical and virtual carrier sensing mechanisms. The network allocation vector is used to implement virtual carrier sensing. FIG. 7 depicts a scenario where the source station first transmits an RTS-frame 701 which sets the NAV 702 for stations within its range. One SIFS 703 later, the destination responds with a CTS-frame 704. This results in stations within range of the destination station setting their NAVs 705. One SIFS after the CTS, the source initiates its data transfer 706. Ideally, the frame exchange sequence is concluded with the destination transmitting an ACK-frame 707, akin to the scenario in FIG. 3. Even in the event that the ACK frame is not transmitted/received, the method of the present invention advocates the interpretation of the NAV as not requiring any continuation or response frame. Therefore, in the ensuing backoff procedure, stations may interpret the duration 708 for pre-emption by the access point and the duration 709 as the minimum amount of time that stations attempting to access the medium must wait prior to performing a random backoff. Hence, the durations 708 and 709 may be inferred as a short PIFS (sPIFS) and a short DIFS (sDIFS). This is contrary to the legacy case where stations must wait for a DIFS (which supersedes both the SIFS and PIFS) before attempting to access the medium.

Similarly, a NAV reset may be interpreted in the same manner i.e. not requiring a response or continuation frame, and stations attempting to access the medium subsequent to a NAV reset may do so, interpreting the first slot for AP pre-emption and the subsequent slot as the minimum idle time that a station must wait before decrementing its random backoff. This results in a reduction of inter-frame spaces, thereby resulting in an increase medium utilization efficiency and consequently throughput.

Figure 8:
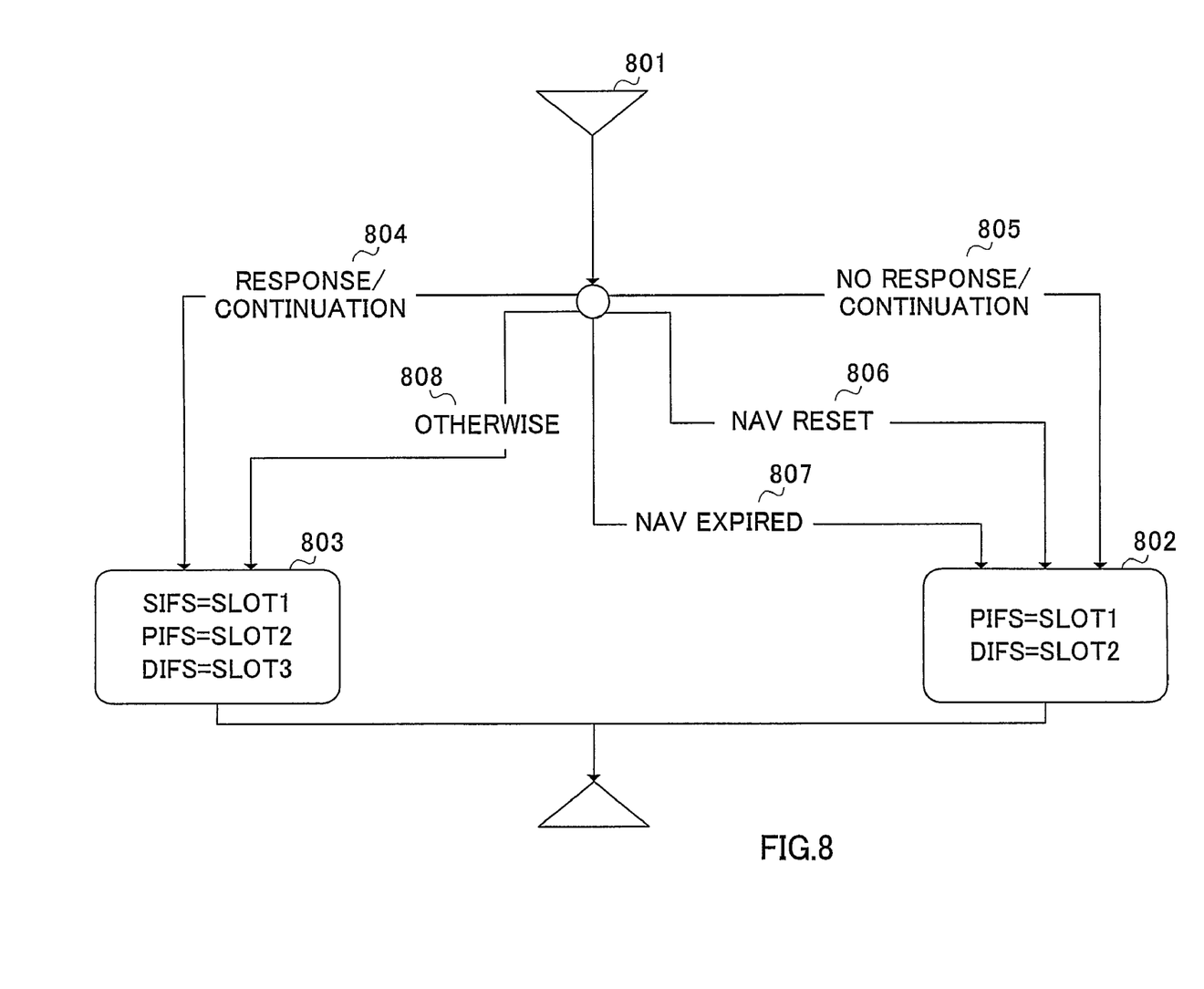
FIG. 8 depicts a decision tree depicting the process adopted by an embodiment of the invention when applied in the context of Non-Patent Document 1.

FIG. 8 depicts a decision tree describing the behavior of the IFS-reduction module 404 so as to effect the methods embodied by the invention in the context of an IEEE 802.11 (Non-Patent Document 1) network. The decision tree is executed for every frame. Upon entry 801 into the decision tree, the IFS reduction module chooses one of several paths, which leads it to the decision which timing mode, two-slot 802 or three-slot 803, is to be used. Path 804 denotes the path adopted when a response-solicited/continuation-expected signal is embedded in the frame. Path 805 denotes the path taken when there is no response or continuation to the frame. Path 806 is followed when a NAV reset occurs in the station and path 807 is taken when the current NAV expires. Path 808 depicts a default or an "otherwise" path which is chosen when the station cannot discern amongst any of the other conditions. This results in the adoption of the default/legacy timings 803.

In summary, the communication system comprises a plurality of stations each equipped with a network adapter capable of providing communication service to the station in a network, said network adapter comprising of an interface to upper-layers by which applications may utilize the service provided by claimed adapter, a medium access controller which controls the device's access to the network's resources, said medium access controller containing an IFS reduction module that facilitates a reduction in medium access overheads thereby improving network throughput, a physical layer modem which supports the transmission-interface used by the network and provides for a means of transmission and reception over the network medium, an interface between said medium access controller and physical layer modem, and an array comprising a singularity or plurality of antennas depending on the transmission scheme in use by the physical layer modem, by which said modem transmits and receives signals over the network medium.

A method is provided for stations to reduce their access overheads by dynamically altering the minimum number of mandatory inter-frame spaces by redefining the interpretation of said inter-frame spaces, said method comprising of the transmitter in conjunction with its transmission, signaling its expectation of a response frame from the recipient, or its intent to continue with another frame, and the media access controllers of all recipient stations interpreting said signal and appropriately modifying the access timing for their impending frame, to contain fewer/shorter time-slots, resulting in more efficient medium utilization.

The method in accordance with the above for reducing access overheads by dynamically altering the minimum number of mandatory required inter-frame spaces from three to two, comprises the transmitter in conjunction with its transmission, signaling, its expectation of a response frame from the recipient, or its intent to continue with another frame transmission, and the media access controllers of all recipient stations interpreting said signal and appropriately modifying their access timing for the impending frame, a positive signal resulting in a minimum of three access time-slots, while a negative signal resulting in two.

The method by which a station receiving a signal indicating an expected response or an intended continuation, as described above, interprets the first idle time-slot subsequent to the transmission as being reserved for signaled response/continuation, the second idle time-slot subsequent to the transmission as being reserved for the network controller to gain prioritized medium access, and the third idle time-slot subsequent to the transmission being the minimum time that a station waiting to initiate a transmission on the medium must wait before commencing its backoff procedure/initiating a transmission.

The method by which a station receiving a signal indicating no expected response or intent to continue, as described above, interprets the first idle time-slot subsequent to the transmission as being reserved for the network controller to gain prioritized medium access, and the second idle time-slot subsequent to the transmission being the minimum time that a station waiting to initiate a transmission on the medium must wait before commencing its backoff procedure/initiating its transmission.

The method of transmitting the signaling information as described above by inserting/modifying/interpreting a suitable field in the MAC header of the frame.

The method of transmitting the signaling information as described above by inserting/modifying/interpreting a suitable field in the preamble of the frame.

The method of transmitting the signaling information as described above by activating an additional (set) of subcarriers in a singularity or plurality of OFDM symbols of the frame.

Another method is provided for stations to reduce their access overheads by dynamically altering the minimum number of mandatory inter-frame spaces by redefining the interpretation of said inter-frame spaces, said method comprising the steps of stations checking their medium activity indicators in conjunction with their physical carrier sensing, determining the end of activity on the medium, and the medium access controllers of said stations appropriately modifying the access timing for their impending frames to contain fewer/shorter time-slots, resulting in more efficient medium utilization.

A further method is provided for stations to reduce their access overheads by dynamically altering the minimum number of mandatory inter-frame spaces by redefining the interpretation of said inter-frame spaces, said method comprising the steps of stations re-setting their medium activity indicators when their physical carrier sensing techniques do not indicate any medium activity at the instant of time that activity is expected as indicated by the medium activity indicator, and the medium access controllers of said stations appropriately modifying the access timing for their impending frames to contain fewer/shorter time-slots, resulting in more efficient medium utilization.

There is further provided an IFS reduction system described in the communication system to implement the methods described above.

This application is based on the Japanese Patent Applications No. 2004-064457 filed on Mar. 8, 2004, and No. 2004-303253 filed on Oct. 18, 2004, entire contents of which are expressly incorporated by reference herein.

INDUSTRIAL APPLICABILITY

The present invention is applicable to a wireless network consisting of a plurality of stations.

The invention claimed is:

1. A wireless communication method comprising:
at a media access controller of all stations in a communication system, detecting, in a received signal, an indication of whether or not a response is expected or whether or not there is an intent to continue and transmitting a detecting result to each station;
at a station receiving, in a received signal, the detecting result indicating a response is expected or there is an intent to continue, interpreting a first idle time slot subsequent to the received signal as being a time that is reserved for a signaled response/continuation, interpreting a second idle time slot subsequent to the received signal as being reserved for a network controller to gain a prioritized medium access, and interpreting a third idle time slot subsequent to the received signal as being a minimum time a station waiting to initiate a transmission on a medium must wait before commencing a backoff procedure or initiating a transmission, and responding to and continuing communicating with the media access controller in the first idle time slot; and
at a station receiving, within a received signal, the detecting result indicating a response is not expected or there is no intent to continue, redefining an interpretation of an inter-frame space to omit a time slot for responding to and continuing communicating with the media access controller, interpreting a first idle time slot subsequent to the received signal as being reserved for the network controller to gain a prioritized medium access, and interpreting a second idle time slot subsequent to the received signal as being a minimum time a station waiting to initiate a transmission on a medium must wait before commencing a backoff procedure or initiating a transmission.

2. The method according to claim 1, wherein said indication is included in a header of a frame.

3. The method according to claim 1, wherein said indication is included in a preamble of a frame.

4. The method according to claim 1, wherein said indication is included in a footer of a frame.

5. The method according to claim 1, wherein said indication is in the form of one subcarrier or plural subcarriers comprised of subcarriers for data transmission or a combination of subcarriers used for data transmission in a multicarrier symbol of a frame.

6. The wireless communication method according to claim 1, further comprising the steps of:
    at the station receiving, within the received signal, the indication that a response is not expected or there is no intent to continue, checking a medium activity indicator determining the end of activity on the medium, and redefining the interpretation of the inter-frame space when the medium activity indicator is checked.

7. The wireless communication method according to claim 1, further comprising the steps of:
    at the station receiving, within the received signal, the indication that a response is not expected or there is no intent to continue, resetting a medium activity indicator when no medium activity is indicated at the instant of time that activity is expected as indicated by the medium activity indicator, and redefining the interpretation of the inter-frame space when the medium activity indicator is reset.

8. A station that communicates with a media access controller in a communication system, the station comprising:
    a receiver that receives a signal that includes a detecting result indicating whether or not a response is expected or whether or not there is an intent to continue, from the media access controller; and
    an interpreter that interprets an idle time slot based on the detecting result, wherein:
    when the detecting result indicates a response is expected or there is an intent to continue, the interpreter interprets a first idle time slot subsequent to the received signal as being a time that is reserved for a signaled response/continuation, interprets a second idle time slot subsequent to the received signal as being reserved for a network controller to gain a prioritized medium access, and interprets a third idle time slot subsequent to the received signal as being a minimum time a station waiting to initiate a transmission on a medium must wait before commencing a backoff procedure or initiating a transmission, and responds to and continues communicating with the media access controller in the first time slot; and
    when the detecting result indicates that a response is not expected or there is no intent to continue, the interpreter redefines an interpretation of an inter-frame space to omit a time slot for responding to and continuing communicating with the media access controller, interprets a first idle time slot subsequent to the received signal as being reserved for the a network controller to gain a prioritized medium access, and interprets a second idle time slot subsequent to the received signal as being a minimum time for which a station waiting to initiate a transmission on a medium must wait before commencing a backoff procedure or initiating a transmission.

* * * * *